US 6,690,818 B2

(12) United States Patent
Ahn

(10) Patent No.: US 6,690,818 B2
(45) Date of Patent: Feb. 10, 2004

(54) APPARATUS AND METHOD FOR INSPECTING SCREEN OF DISPLAYING DEVICE

(75) Inventor: Hyeong-min Ahn, Seongnam (KR)

(73) Assignee: Samsung Electronics Co., Ltd., Suwon (KR)

(*) Notice: Subject to any disclaimer, the term of this patent is extended or adjusted under 35 U.S.C. 154(b) by 521 days.

(21) Appl. No.: 09/765,409

(22) Filed: Jan. 22, 2001

(65) Prior Publication Data

US 2001/0016060 A1 Aug. 23, 2001

(30) Foreign Application Priority Data

Jan. 24, 2000 (KR) .......................... 2000-3297

(51) Int. Cl.⁷ ................................ G06K 9/00
(52) U.S. Cl. ................................... 382/141
(58) Field of Search ........................ 382/141, 143, 382/100, 181; 348/189, 180, 191, 86, 92, 93, 177, 181; 356/239.1, 520; 345/100; 324/765

(56) References Cited

U.S. PATENT DOCUMENTS

| 4,894,718 A | * | 1/1990 | Hung .......................... 348/181 |
| 5,638,175 A | * | 6/1997 | Brunfeld et al. ............. 356/520 |
| 5,796,425 A |   | 8/1998 | Minami et al. ............... 348/181 |
| 6,252,626 B1 | * | 6/2001 | Buckley et al. .............. 348/189 |
| 6,307,393 B1 | * | 10/2001 | Shimura ....................... 324/765 |
| 6,337,677 B1 | * | 1/2002 | Higashi ........................ 345/100 |

FOREIGN PATENT DOCUMENTS

| JP | 09-214987 | 8/1997 |
| JP | 10-48149 | 2/1998 |
| KR | 1992-0003658 | 5/1992 |
| KR | 1993-0008773 | 9/1993 |
| KR | 1996-005415 | 2/1996 |
| KR | 1996-0016430 | 12/1996 |
| KR | 0143517 | 4/1998 |
| KR | 0156656 | 7/1998 |
| KR | 0181580 | 12/1998 |
| KR | 10-0189178 | 1/1999 |
| KR | 10-0198527 | 3/1999 |
| KR | 2000-0051199 | 8/2000 |

* cited by examiner

Primary Examiner—Samir Ahmed
Assistant Examiner—Vikkram Bali
(74) Attorney, Agent, or Firm—Staas & Halsey LLP

(57) ABSTRACT

An apparatus and a method for inspecting an image, synchronizing a pattern frame synchronizing signal and an image frame synchronizing signal to initiate grabbing an inspection pattern, where the pattern frame synchronizing signal and the image frame synchronizing signal have different frequencies. With this configuration, where the frequencies of the pattern frame synchronizing signal and the image frame synchronizing signal are not identical, since grabbing an image of the inspection pattern is initiated by synchronizing the image frame synchronizing signal with the pattern frame synchronizing signal, the noise inserted into the image of the inspection pattern becomes regular, thereby resulting in enhancing the reliability of the image inspection.

6 Claims, 5 Drawing Sheets

APPARATUS AND METHOD FOR INSPECTING SCREEN OF DISPLAYING DEVICE

FIELD OF THE INVENTION

The present invention relates in general to an apparatus and a method for inspecting a screen of a displaying device, and more particularly, an apparatus and a method for inspecting a screen of a displaying device, wherein an image frame synchronizing signal can be synchronized at a random phase point of a pattern frame synchronizing signal.

DESCRIPTION OF RELATED ART

An image inspection apparatus is used to inspect the quality of an image such as contrast, convergence, focus, etc. of an image displaying apparatus such as a cathode-ray tube (CRT), in the final stage of the production process of the displaying apparatus.

The conventional image inspection apparatus is, as shown in FIG. 4, comprised of a pattern generator 111 connected to a CRT 101 to be inspected, a camera 121 installed in front of the CRT 101, and an image inspector 131 connected to the camera 121. The pattern generator 111 is comprised of a pattern signal generating part 113 generating an inspection pattern signal for an inspection pattern such as a cross-hatch pattern to be displayed on the CRT 101, and a pattern synchronizing signal generating part 115 generating a pattern frame synchronizing signal as a trigger signal to display the inspection pattern periodically on the CRT. The camera 121 is comprised of a grabbing part 122 grabbing the inspection pattern displayed on the CRT 101, and an image frame synchronizing signal generating part 126 generating an image frame synchronizing signal as a trigger signal allowing the grabbing part 122 to periodically grab the inspection pattern displayed on the CRT 101. The image inspector 131 is comprised of an image processing part 113 converting an analog image signal of the inspection pattern from the camera 121 into a digital image signal, and a memory 135 storing the converted digital image signal therein.

Hereinbelow, an image inspection method using the conventional image inspection apparatus will be described.

First, the pattern generator 111 generates the inspection pattern signal and a pattern synchronizing signal. The pattern synchronizing signal is comprised of the pattern frame synchronizing signal and a pattern horizontal synchronizing signal; the pattern frame synchronizing signal divides the inspection pattern displayed on the CRT 101 frame by frame, and the pattern horizontal synchronizing signal divides the inspection pattern within a frame in lines. The frequency of the pattern frame synchronizing signal varies depending upon the image displaying apparatus. For example, the image displaying apparatus according to the National Television System Committee (NTSC) system has the frequency of the pattern frame synchronizing signal of 60 Hz whereas CRT monitors and digital TVs have the frequency of the pattern frame synchronizing signal more than 60 Hz. The inspection pattern is continuously displayed on the CRT 101 according to the pattern synchronizing signal. The inspection pattern displayed on the CRT 101 is grabbed by the camera 121 according to the image frame synchronizing signal. The frequency of the image frame synchronizing signal is 60 Hz in the case of the camera employing the NTSC system, but which may vary depending upon the type of the camera 121. The inspection pattern displayed on the CRT varies in position and brightness, etc. in response to adjustment of focus and convergence, etc. of the CRT 101, and therefore, it is necessary to continuously grab the inspection pattern displayed on the CRT 101 during adjustment. The analog image signal of the inspection pattern grabbed by the grabbing part 122 is inputted into the image inspector 131. The inputted analog image signal is converted into a digital image signal by the image processing part 133, and the converted image signal is stored in the memory 135. The image of the CRT 101 is inspected by obtaining a brightness value of the inspection pattern from the digital image signal.

However, according to the conventional image inspection apparatus, where the pattern frame synchronizing signal and the image frame synchronizing signal have different frequencies, a phenomenon that a bright or dark part of the grabbed image flows vertically is generated on the image of the inspection pattern grabbed by the camera 121. Further, as shown in FIG. 5, the phase difference between the continuous pattern frame synchronizing signals (A) and the image frame synchronizing signals (B and C) varies whenever the inspection pattern is grabbed. In FIG. 5, a zero phase point of the pattern frame synchronizing signal (A) is denoted D, the frequency of the pattern frame synchronizing signal (A) is 80 Hz, and the frequencies of the image frame synchronizing signals (B and C) are both 60 Hz. Therefore, the noise interfered whenever an image of the inspection pattern is grabbed is not standardized, thereby lowering the reliability of the image inspection. A further problem has occurred in inspecting an image of 60 Hz as a high definition monitor whose vertical frequencies have sharply increased has recently released in the market. The same problem is expected in the case of color TV sets having an improved high definition.

SUMMARY OF THE INVENTION

Accordingly, the present invention has been made keeping in mind the above-described shortcomings, and it is an object of the present invention to provide an apparatus and a method for inspecting an image, synchronizing a pattern frame synchronizing signal and an image frame synchronizing signal to initiate grabbing an inspection pattern, where the pattern frame synchronizing signal and the image frame synchronizing signal have different frequencies.

This and other objects of the present invention may be achieved by a provision of an apparatus for inspecting an image of an image displaying apparatus, comprising a pattern generator provided with a pattern signal generating part generating an inspection pattern signal and a pattern frame synchronizing signal generating part generating a pattern frame synchronizing signal and displaying an inspection pattern on the image displaying apparatus according to the inspection pattern signal and pattern frame synchronizing signal; a camera provided with an image frame synchronizing signal generating part generating an image frame synchronizing signal, grabbing the inspection pattern displayed on the image displaying apparatus according to the image frame synchronizing signal; a phase selecting part selecting a random phase point of the pattern frame synchronizing signal generated by the pattern frame synchronizing signal generating part; and a V-sync signal synchronizing part synchronizing a first signal among the image frame synchronizing signals generated by the image frame synchronizing signal generating part with the phase point selected in the phase selecting part.

Preferably, the phase point is a zero phase point of the pattern frame synchronizing signal.

The pattern frame synchronizing signal generating part generates a plurality of pattern frame synchronizing signals having different frequencies, said apparatus further comprising a signal selection part selecting a pattern frame synchronizing signal among the plurality of pattern frame synchronizing signals generated by the pattern frame synchronizing signal generating part; and a control part controlling the pattern frame synchronizing signal generating part so as to generate the pattern frame synchronizing signal selected by the signal selection part.

According to another aspect of the present invention, this and other objects may also be achieved by a method for inspecting an image of an image displaying apparatus, comprising the steps of generating an inspection pattern signal and a pattern frame synchronizing signal; displaying an inspection pattern on the image displaying apparatus according to the inspection pattern signal and pattern frame synchronizing signal; selecting a random phase point of the pattern frame synchronizing signal; generating an image frame synchronizing signal to allow a first signal of the image frame synchronizing signals to be synchronized with the phase point selected at the phase point selecting step; and grabbing the inspection pattern displayed on the image displaying apparatus according to the image frame synchronizing signal.

Preferably, the phase point is a zero phase point of the pattern frame synchronizing signal.

The step of generating the pattern frame synchronizing signal is comprised of the substeps of generating a plurality of pattern frame synchronizing signals having different frequencies; selecting one among the plurality of pattern frame synchronizing signals; and generating the selected pattern frame synchronizing signal.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENTS

Figure 1:
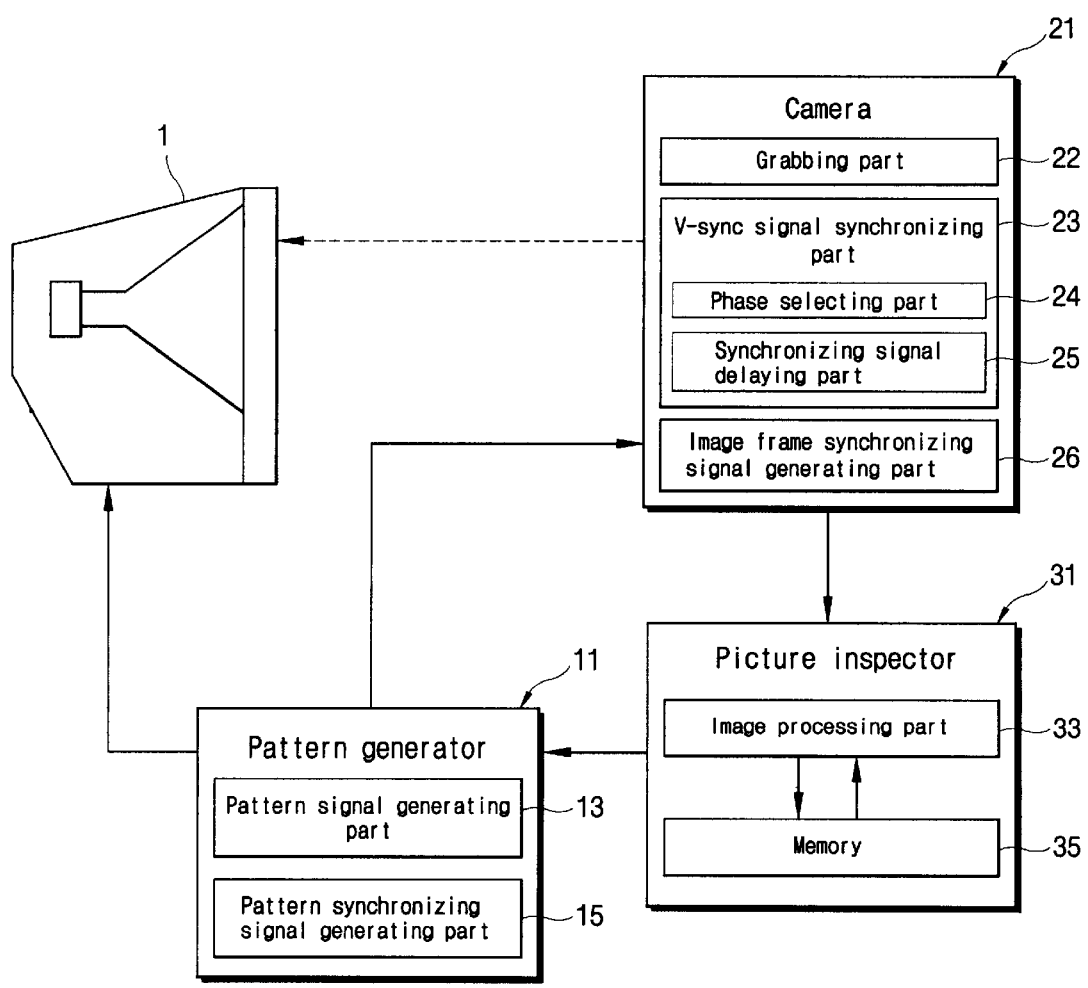
FIG. 1 is a schematic diagram of an image inspection apparatus according to the present invention.

Referring to now FIG. 1, an image inspection apparatus according to the present invention is comprised of a pattern generator 11 connected to a CRT 1 to be inspected, a camera 21 installed in front of the CRT 1, being connected to the pattern generator 11, and an image inspector 31 connected to the camera 21. The pattern generator 11 is comprised of a pattern signal generating part 13 generating an inspection pattern signal for an inspection pattern such as a cross-hatch pattern to be displayed on the CRT 1, and a pattern synchronizing signal generating part 15 generating a pattern frame synchronizing signal as a trigger signal to periodically display the inspection pattern on the CRT 1 and a pattern horizontal synchronizing signal. The camera 21 is comprised of a grabbing part 22 grabbing the inspection pattern to be displayed, an image frame synchronizing signal generating part 26 generating an image frame synchronizing signal as a trigger signal to periodically grab the inspection pattern displayed on the CRT 1, in the grabbing part 22, and a V-sync signal synchronizing part 23 synchronizing the image frame synchronizing signal with the pattern frame synchronizing signal. The V-sync signal synchronizing part 23 is comprised of a phase selecting part 24 selecting a zero phase point between the pattern frame synchronizing signals inputted from the pattern generator 11, and a synchronizing signal delaying part 25 delaying the image frame synchronizing signal to be synchronized with the zero phase point of the pattern frame synchronizing signal. The image inspector 31 is comprised of an image processing part 33 converting an analog image signal of the inspection pattern from the camera 21 into a digital image signal, and a memory 35 storing the converted digital image signal therein.

Figure 3:
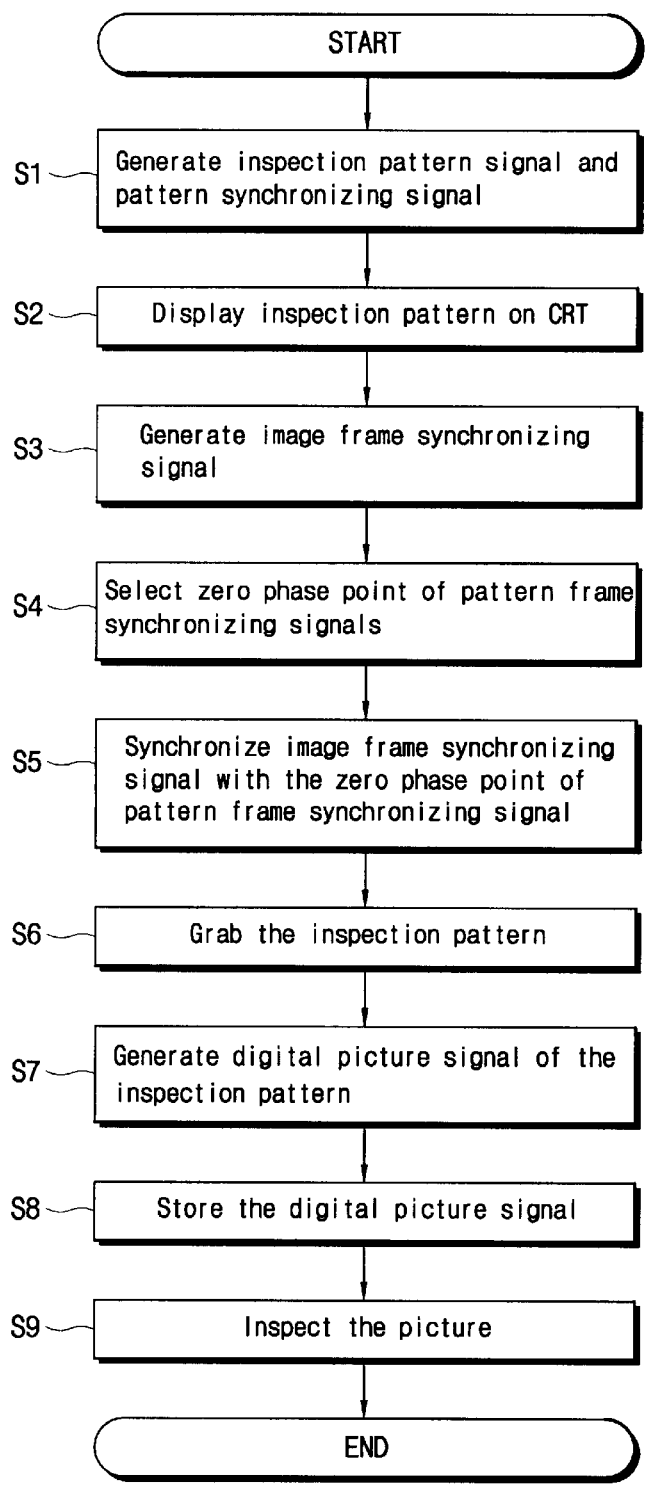
FIG. 3 is a flow chart showing an image inspection method according to the present invention.
Figure 4:
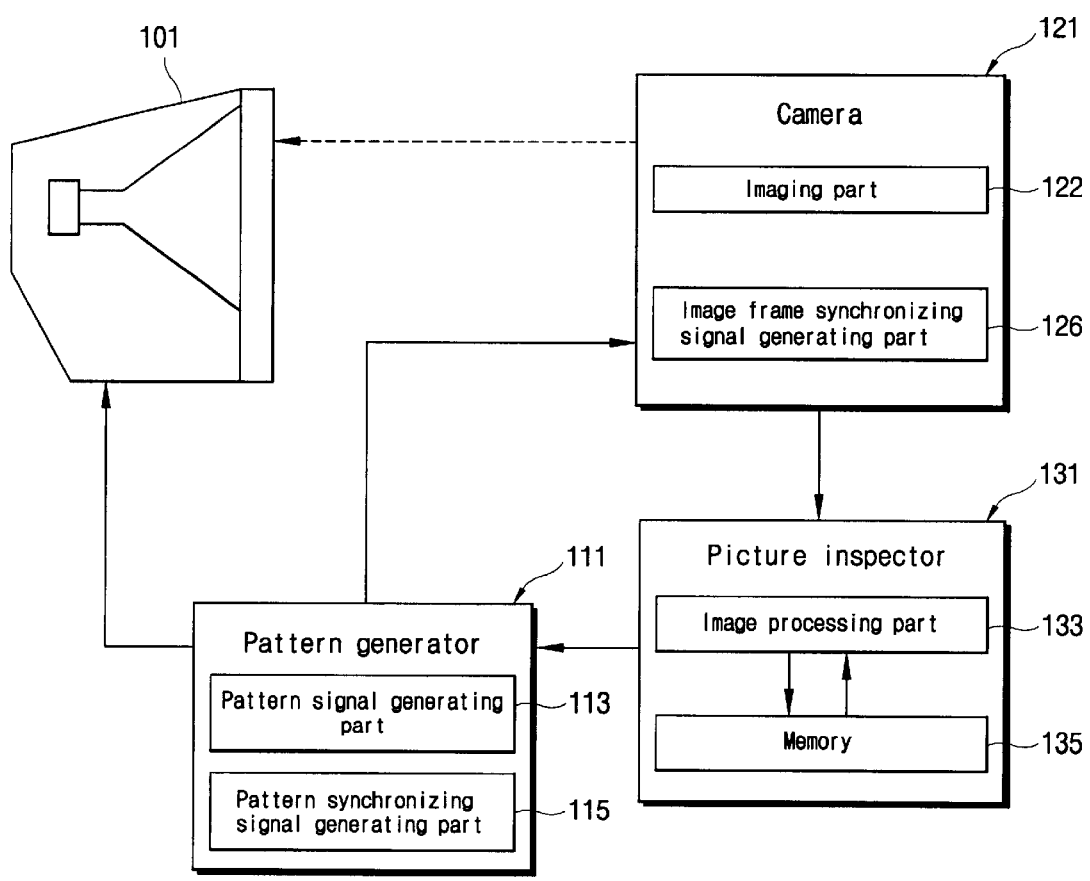
FIG. 4 is a schematic diagram showing a construction of a conventional image inspection apparatus.
Figure 5:
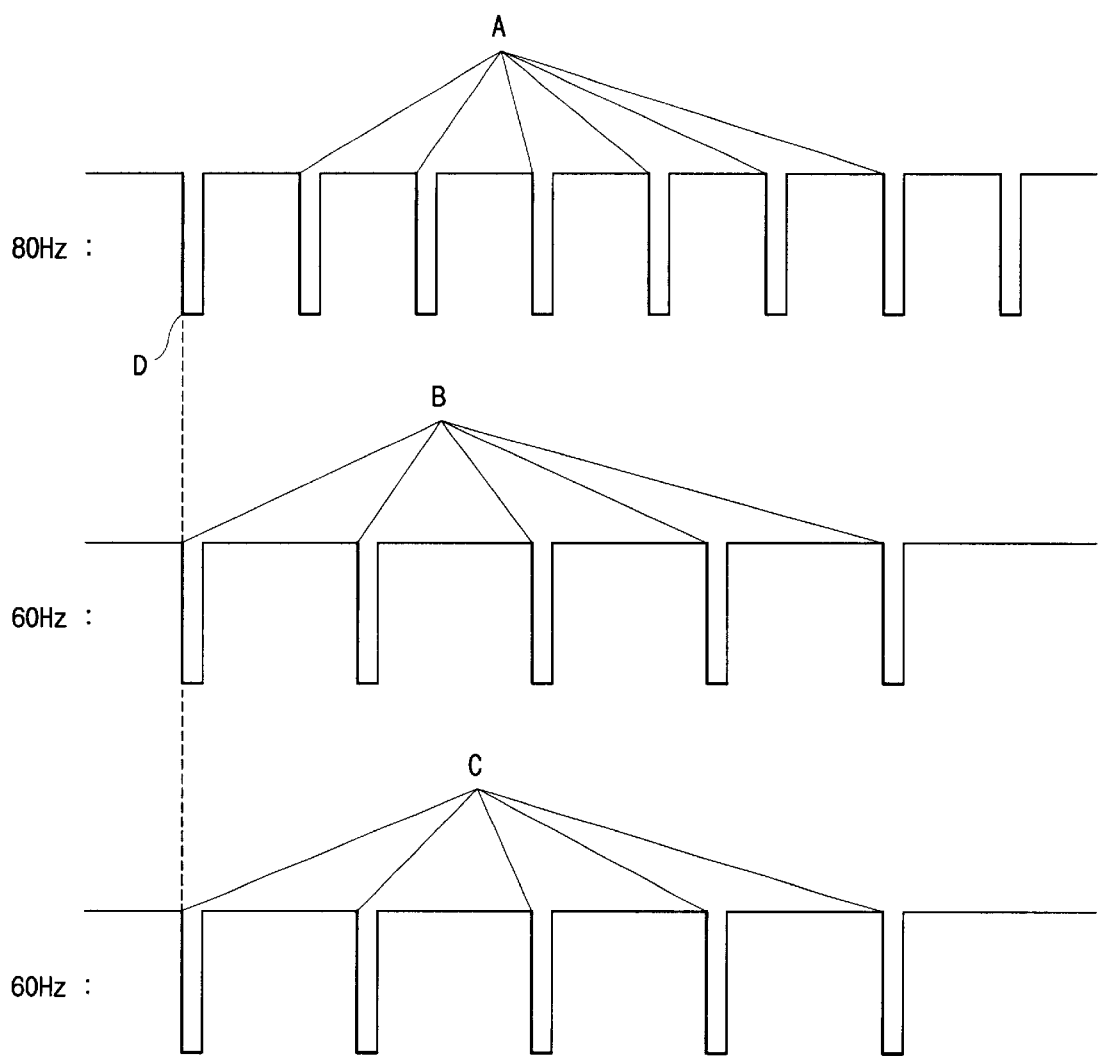
FIG. 5 is a timing diagram of a pattern frame synchronizing signal and an image frame synchronizing signal of the prior art.

The image inspection method employing the image inspection apparatus according to the present invention will be described with reference to FIG. 3.

Figure 2:
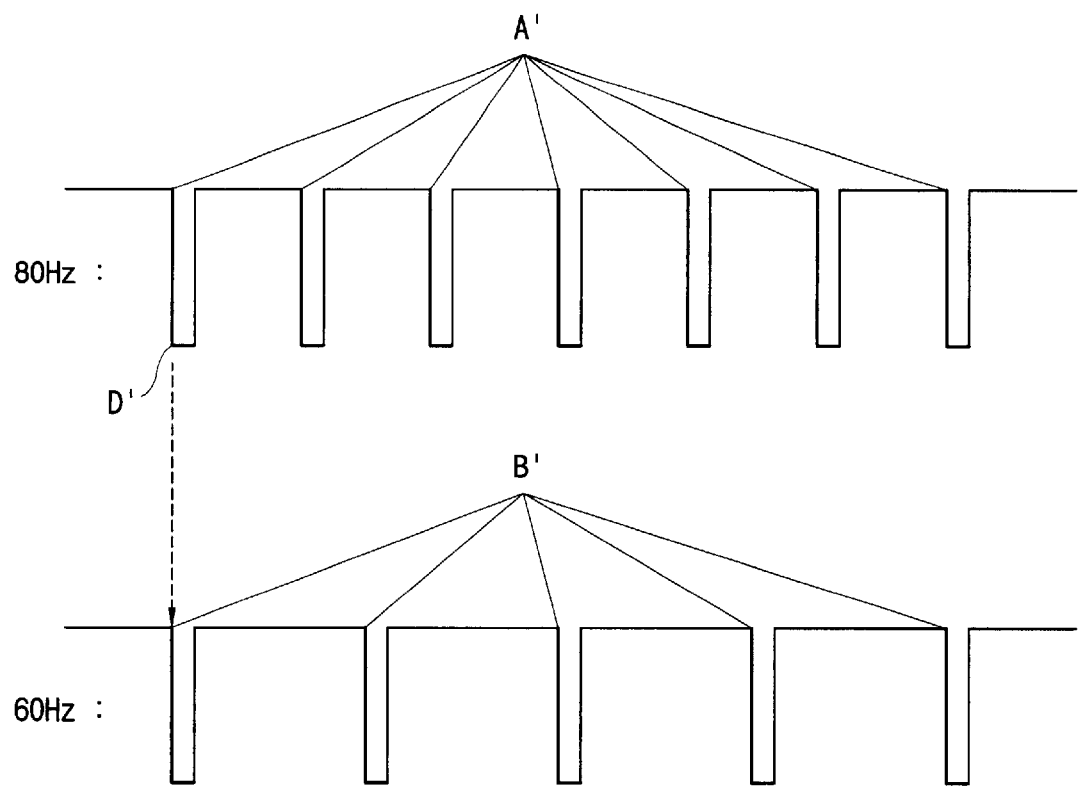
FIG. 2 is a timing diagram of a pattern frame synchronizing signal and an image frame synchronizing signal according to the present invention.

First, the pattern generator 11 generates the inspection pattern signal and a pattern synchronizing signal (S1). The pattern synchronizing signal is comprised of the pattern frame synchronizing signal and the pattern horizontal synchronizing signal; the pattern frame synchronizing signal divides the inspection pattern displayed on the CRT 1 frame by frame, and the pattern horizontal synchronizing signal divides the inspection pattern within a frame in lines. The frequency of the pattern frame synchronizing signal varies depending upon the kind of the image displaying apparatus. The inspection pattern is sequentially displayed on the CRT 1 according to the pattern synchronizing signal (S2). Then, the image frame synchronizing signal is generated from the image frame synchronizing signal generating part 26 (S3). The pattern frame synchronizing signal generated from the pattern generator 11 is inputted into the V-sync signal synchronizing part 23, and then the zero phase point of the pattern frame synchronizing signal is selected by the phase selecting part 24 (S4). The image frame synchronizing signal generated from the image frame synchronizing signal generating part 26 is delayed for a predetermined time to be synchronized with the zero phase point selected by the phase selecting part 24, as shown in FIG. 3 (S5). Referring to FIG. 2, the pattern frame synchronizing signal is indicated by A', the image frame synchronizing signal is indicated by B', the zero phase point of the pattern frame synchronizing signal is indicated by D', the frequency of the pattern frame synchronizing signal is given 80 Hz and that of the image frame synchronizing signal is given 60 Hz. The inspection pattern displayed on the CRT 1 is grabbed according to the image frame synchronizing signal synchronized with the pattern frame synchronizing signal (S6). The frequency of the image frame synchronizing signal is 60 Hz in the case of the camera employing the NTSC system, but which may vary depending upon the type of the camera 121. An analog image signal of the inspection pattern grabbed by the camera 21 is inputted into the image inspector 31 and then converted into a digital image signal of the inspection pattern in the image processing part 33 (S7). The converted digital image signal of the inspection pattern is stored in the memory 35 (S8). Inspection of the image displayed on the CRT 1 is conducted by obtaining a brightness value of the inspection pattern from the digital image signal stored in the memory 35 (S9).

Where the frequencies of the pattern frame synchronizing signal and the image frame synchronizing signal are not identical, if a first signal of the image frame synchronizing signals is synchronized with a zero phase point of the pattern frame synchronizing signals, a constant noise can be inserted into a grabbed image of the inspection pattern since the phase difference between the continuous pattern frame synchronizing signals and the image frame synchronizing signals becomes constant, although the noise inserted into the grabbed image cannot be entirely removed. Thus, the image inspection is performed after removing the noise from the grabbed image of the inspection pattern, thereby enhancing the reliability of the image inspection.

According to the above-described embodiment, the image frame synchronizing signal is synchronized with a zero phase point of the pattern frame synchronizing signal. However, the image frame synchronizing signal may be synchronized with a random phase point of the pattern frame synchronizing signal.

The above-described embodiment has disclosed the present invention by applying it to the CRT by way of example. However, the present invention may be embodied in general image displaying apparatuses such as a projection monitor, a projection television, etc.

The pattern generator according to the present invention generates a pattern frame synchronizing signal having a single frequency. However, the pattern generator may be used in conducting an image inspection by generating a plurality of pattern frame synchronizing signals having different frequencies and by selecting a pattern frame synchronizing signal whose frequency depends upon the image displaying apparatus, using a means for selecting a pattern frame synchronizing signal as desired by an inspector.

As described above, where the frequencies of the pattern frame synchronizing signal and the image frame synchronizing signal are not identical, since grabbing an image of the inspection pattern is initiated by synchronizing the image frame synchronizing signal with the pattern frame synchronizing signal, the noise inserted into the image of the inspection pattern becomes regular, thereby resulting in enhancing the reliability of the image inspection.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An apparatus for inspecting an image of an image displaying apparatus, comprising:

a pattern generator provided with a pattern signal generating part generating an inspection pattern signal and a pattern frame synchronizing signal generating part generating a pattern frame synchronizing signal and displaying an inspection pattern on the image displaying apparatus according to the inspection pattern signal and pattern frame synchronizing signal;

a camera provided with an image frame synchronizing signal generating part generating an image frame synchronizing signal, grabbing the inspection pattern displayed on the image displaying apparatus according to the image frame synchronizing signal;

a phase selecting part selecting a random phase point of the pattern frame synchronizing signal generated by the pattern frame synchronizing signal generating part; and a V-sync signal synchronizing part synchronizing a first signal among the image frame synchronizing signals generated by the image frame synchronizing signal generating part with the phase point selected in the phase selecting part.

2. The apparatus according to claim 1, wherein the phase point is a zero phase point of the pattern frame synchronizing signal.

3. The apparatus according to claim 1, wherein the pattern frame synchronizing signal generating part generates a plurality of pattern frame synchronizing signals having different frequencies, said apparatus further comprising a signal selection part selecting a pattern frame synchronizing signal among the plurality of pattern frame synchronizing signals generated by the pattern frame synchronizing signal generating part; and a control part controlling the pattern frame synchronizing signal generating part so as to generate the pattern frame synchronizing signal selected by the signal selection part.

4. A method for inspecting an image of an image displaying apparatus, comprising the steps of:

generating an inspection pattern signal and a pattern frame synchronizing signal;

displaying an inspection pattern on the image displaying apparatus according to the inspection pattern signal and pattern frame synchronizing signal;

selecting a random phase point of the pattern frame synchronizing signal;

generating an image frame synchronizing signal to allow a first signal of the image frame synchronizing signals to be synchronized with the phase point selected at the phase point selecting step; and grabbing the inspection pattern displayed on the image displaying apparatus according to the image frame synchronizing signal.

5. The method according to claim 4, wherein the phase point is a zero phase point of the pattern frame synchronizing signal.

6. The method according to claim 4, wherein the step of generating the pattern frame synchronizing signal is comprised of the substeps of:

generating a plurality of pattern frame synchronizing signals having different frequencies;

selecting one among the plurality of pattern frame synchronizing signals; and generating the selected pattern frame synchronizing signal.

* * * * *